United States Patent
Tanaka

(10) Patent No.: US 7,474,347 B2
(45) Date of Patent: Jan. 6, 2009

(54) SOLID-STATE IMAGE PICKUP DEVICE HAVING A LENSING FUNCTION

(75) Inventor: Kiyohisa Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 10/216,262

(22) Filed: Aug. 9, 2002

(65) Prior Publication Data

US 2003/0035058 A1 Feb. 20, 2003

(30) Foreign Application Priority Data

Aug. 17, 2001 (JP) ............................. 2001-248063

(51) Int. Cl.
*H04N 3/14* (2006.01)
*H04N 5/225* (2006.01)

(52) U.S. Cl. ..................... 348/316; 348/335; 348/340

(58) Field of Classification Search ................ 348/316, 348/360, 208.11, 266, 290, 291; 235/462.2, 235/462.11, 462.24

See application file for complete search history.

(56) References Cited

U.S. PATENT DOCUMENTS

| | | | | |
|---|---|---|---|---|
| 4,900,907 A | * | 2/1990 | Matusima et al. | 235/472.01 |
| 5,592,223 A | * | 1/1997 | Takamura et al. | 348/340 |
| 6,137,535 A | * | 10/2000 | Meyers | 348/340 |
| 6,141,048 A | * | 10/2000 | Meyers | 348/294 |
| 6,749,120 B2 | * | 6/2004 | Hung et al. | 235/472.01 |
| 6,824,058 B2 | * | 11/2004 | Patel et al. | 235/462.2 |
| 7,133,076 B1 | * | 11/2006 | Campbell | 348/340 |

FOREIGN PATENT DOCUMENTS

| JP | 02-065386 | * | 3/1990 |
|---|---|---|---|
| JP | 03-145395 | * | 6/1991 |

* cited by examiner

*Primary Examiner*—Luong T Nguyen
(74) *Attorney, Agent, or Firm*—Robert J. Depke; Rockey, Depke & Lyons, LLC.

(57) ABSTRACT

A substantially semicylindrical lens having a lensing function, a shading-correcting (reducing) function, and a predetermined-wavelength transmitting function is formed on the upper surface of a device chip including a sensor array, a CCD transfer register, a read-out gate, and the like. The substantially semicylindrical lens is semicircular in cross section along a second direction, and has a lens surface curved in a first direction so that its diameter is larger at both ends in the first direction than in the center in order to serve a function of correcting the shading caused by the optical conditions outside the device. The substantially semicylindrical lens is partially or entirely made of a substance that is transmissive with respect to a signal having a predetermined wavelength.

15 Claims, 2 Drawing Sheets

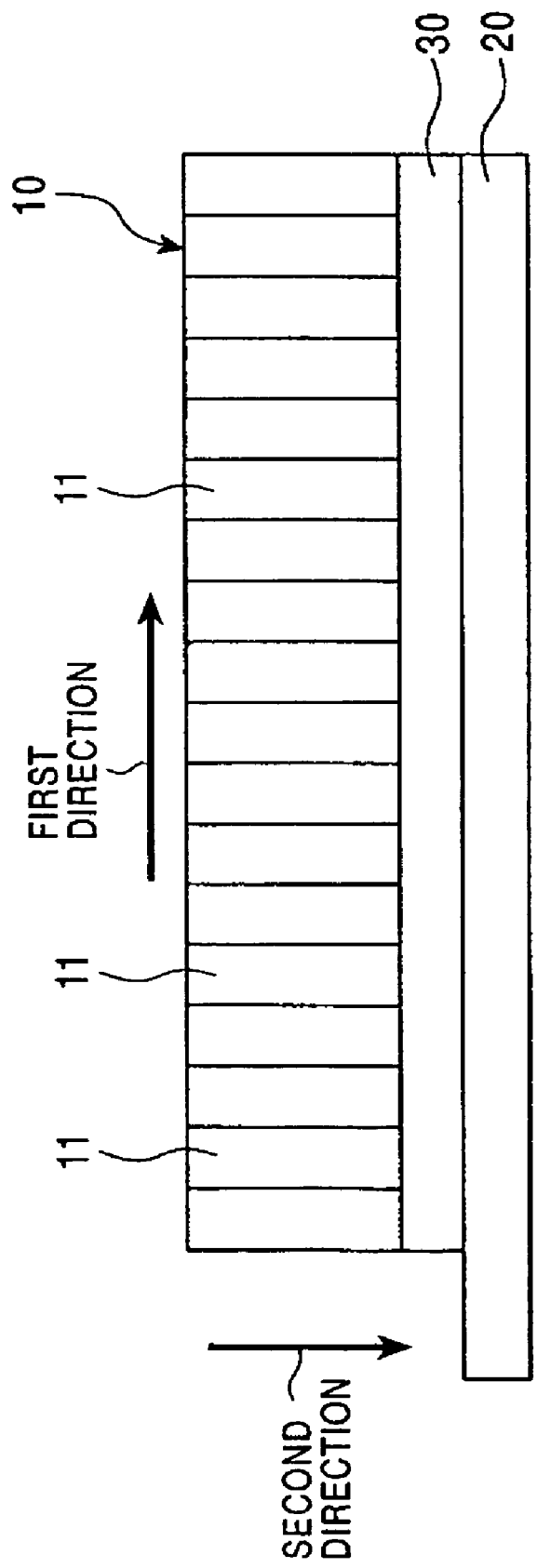

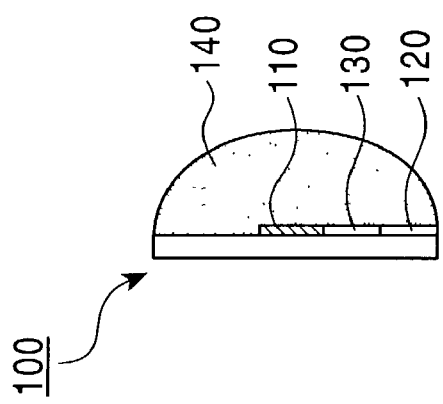
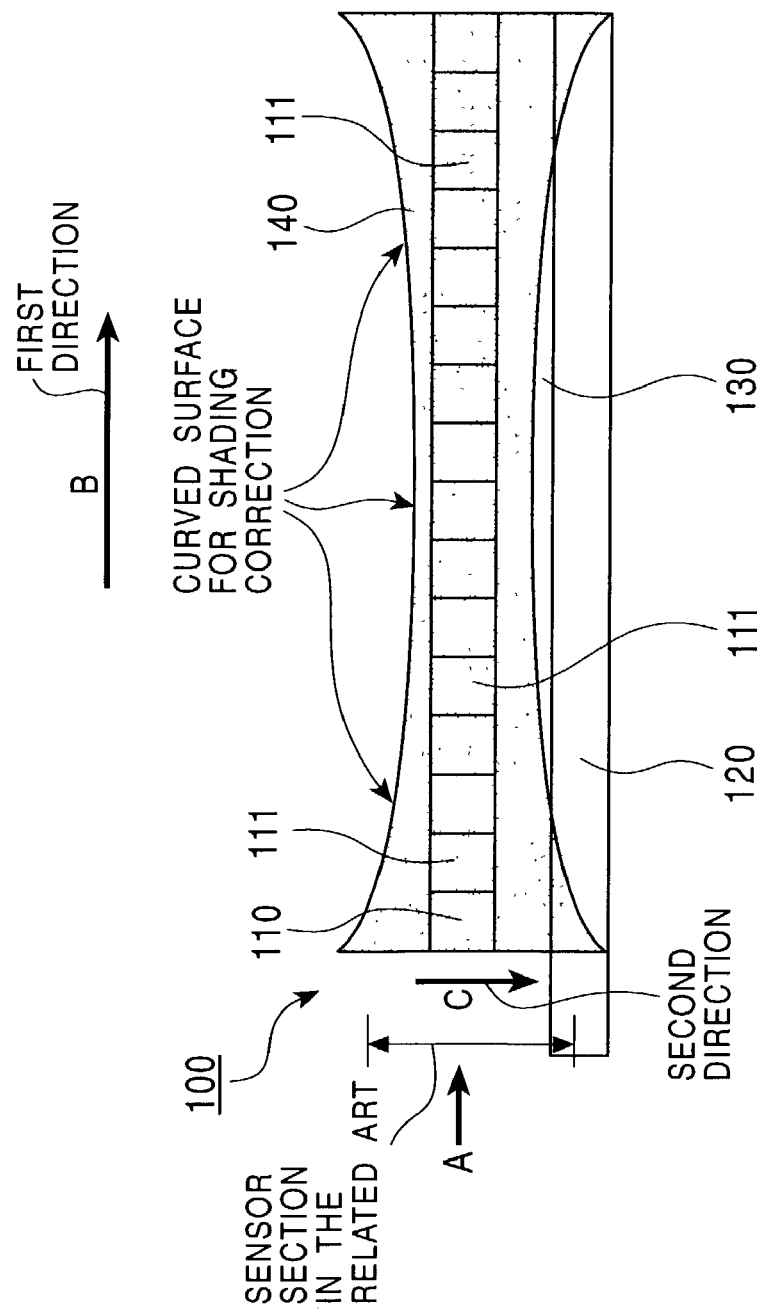

SOLID-STATE IMAGE PICKUP DEVICE HAVING A LENSING FUNCTION

This application claims priority to Japanese Patent Application Number JP2001-248063 filed Aug. 17, 2001 which is incorporated herein by reference.

BACKGROUND OF THE INVENTION

1. Field of the Invention

The present invention relates to a solid-state image pickup device used as, for example, a barcode reader (also referred to as a "barcode scanner").

2. Description of the Related Art

A known type of linear sensor adopted in a barcode reader has, for example, the configuration shown in FIG. 1.

The barcode reader includes a sensor array 10 in which a plurality of photosensors 11 are arranged in a first direction so as to generate signal charges in accordance with the amount of light received, a CCD transfer register 20 disposed along the sensor array 10 so as to read out the signal charge generated by each of the photosensors 11 in a second direction and to transfer the signal charge in the first direction, and a read-out gate (ROG) 30 disposed between the sensor array 10 and the CCD transfer register 20 so as to read out the signal charges from the photosensors 11 toward the CCD transfer register 20.

The signal charge transferred by the CCD transfer register 20 is sent to an output amplifier having a charge-voltage conversion function, is converted into a voltage signal, and is then output.

In the above known barcode reader, however, in response to demands for increased sensor sensitivity, the photosensors 11 extend in the second direction, as shown in FIG. 1, in order to read special markings, that is, barcode labels. For this reason, the chip size is increased, and the cost of the entire solid-state image pickup device is increased.

Furthermore, since the photosensors 11 of the sensor array 10 extend in the second direction, the reading time from the sensor array 10 to the CCD transfer register 20 is longer than in a case using normal photosensors of a square array shape. Moreover, the amplitude of a pulse necessary for reading (a so-called read-out gate pulse φROG) is increased, and a low supply voltage that is required of the barcode reader is impossible.

In addition, since the known barcode reader adopts a reduction optical system because a fixed depth of field is necessary, the image of an object is reduced in size and is focused to the sensor array with regular convex lenses.

In this case, however, a signal difference (called "shading") is caused between the center portion and the peripheral portion of the object because of the lens characteristics.

While arithmetic processing has hitherto been performed by a subsequent signal processing section in order to correct the shading, when the object is a barcode, the amount of incident light varies depending on the reading conditions, and therefore, the shading cannot be completely corrected, and a reading error arises.

Moreover, since not all of the sensors arranged in the first direction of the sensor array are used, and only the sensors near the center are used, the performance of the pickup device is not fully used, and this is obviously inefficient.

While barcode readers adopt a light source for emitting light with a predetermined wavelength (660 nm in general) depending on the special characteristics of the object, some of them use an optical filter that prevents signal saturation caused when the incident light has another wavelength. This increases the cost of the parts.

SUMMARY OF THE INVENTION

Accordingly, an object of the present invention is to provide a solid-state image pickup device having a lensing function in which a sensor array has photosensors that are short in the second direction, thus allowing the size and cost of the sensor array to be reduced.

In order to achieve the above object, according to one aspect, the present invention provides a solid-state image pickup device including a sensor array having a plurality of photosensors arranged in a first direction so as to generate signal charges in accordance with the amount of received light, a CCD transfer register disposed along the sensor array so as to read out the signal charge generated by each of the photosensors in a second direction and to transfer the signal charge in the first direction, and a substantially semicylindrical lens placed on the upper surface of the sensor array in an on-chip fashion so as to collect incident light onto the photosensors of the sensor array.

With such a configuration, the sensor array can be constituted by photosensors that are short in the second direction, and the size and cost of the sensor array can be reduced.

Further objects, features and advantages of the present invention will become apparent from the following description of the preferred embodiments with reference to the attached drawings.

BRIEF DESCRIPTION OF THE DRAWINGS

FIG. 1 is a schematic plan view showing a specific configuration of a linear sensor section of a barcode reader of the related art; and FIGS. 2A and 2B are a schematic plan view and a schematic side view, respectively, showing a specific configuration of a linear sensor section of a barcode reader according to an embodiment of the present invention.

DESCRIPTION OF THE PREFERRED EMBODIMENTS

An embodiment of the present invention will be described in detail below with reference to the attached drawings.

While the present invention will be described with reference to what is presently considered to be a preferred embodiment that includes technically preferred restrictions, it is to be understood that the invention is not limited to the disclosed embodiment, unless otherwise specified in the following description.

A solid-state image pickup device of this embodiment is a linear sensor serving as a barcode reader. In the solid-state image pickup device, a substantially semicylindrical lens of an on-chip structure disposed on a sensor array has a lensing function, a shading-correcting (reducing) function, and a predetermined-wavelength transmitting function.

FIG. 2A is a schematic plan view showing a specific configuration of a linear sensor section of a barcode reader of this embodiment, and FIG. 2B is a schematic side view of the linear sensor section as viewed from the direction shown by arrow A in FIG. 2A.

In the barcode reader, a sensor array 110 in which a plurality of photosensors 111 are arranged in a first direction (shown by arrow B) so as to generate signal charges in accordance with the amount of received light, a CCD transfer register 120 disposed along the sensor array 110 so as to read the signal charge generated by each photosensor 111 in a second direction (shown by arrow C) and to transfer the signal charge in the first direction, and a read-out gate (ROG) 130 disposed between the sensor array 110 and the CCD transfer resistor 120 so as to read out the signal charge of the photosensor 111 toward the CCD transfer register 120, are formed on a device chip 100 made of a semiconductor substrate. A substantially semicylindrical lens 140 is formed on the upper surface of the device chip 100. The substantially semicylindrical lens 140 has a lensing function, a shading-correcting (reducing) function, and a predetermined-wavelength transmitting function.

The substantially semicylindrical lens 140 is substantially semicircular in cross section along the second direction, and has a lens surface curved in the first direction in order to serve a function of correcting the shading caused by the optical conditions outside the device. That is, the lens surface of the substantially semicylindrical lens 140 is curved in the first direction so that its diameter is larger at both ends in the first direction than in the center.

In the substantially semicylindrical lens 140 having such a lens surface, light to be incident on the sensor array 110 is collected into each photosensor 111. Therefore, the photosensor 111 is shorter in the second direction than in the related art shown in FIG. 1. This contributes to size reduction of the device chip 100, an increase in the charge read-out speed, and reduced power consumption.

Since the diameter of the lens surface is larger at both ends in the first direction than in the center, a signal difference between the peripheral portion and the center portion of an object, that is, shading, can be reduced. Consequently, signal processing is unnecessary, and the cost of the entire device is reduced. Signal processing may be performed as necessary.

The substantially semicylindrical lens 140 is partially or entirely made of a substance that transmits a signal having a predetermined wavelength (for example, an organic or inorganic transparent resin material for use in a filter for transmitting light with a predetermined wavelength).

Therefore, it is possible to efficiently read, for example, light with a predetermined wavelength (660 nm in general) from a light source. This eliminates the necessity to add a special filter, and reduces the cost of the entire device. A filter may be added as necessary.

While the substantially semicylindrical lens 140 of this embodiment has both the shading-correcting function and the predetermined-wavelength transmitting function, besides the lensing function for controlling the amount of incident light, it may have only one of these functions.

Sufficient advantages can be achieved, for example, the length of the photosensors can be reduced, even when the substantially semicylindrical lens having the lensing function is simply semicylindrical.

That is, when a simply semicylindrical lens that does not have a curved shape for shading correction is used, shading may be corrected by signal processing or by other means, or the lens may be made of a material that does not have a wavelength dependency. The predetermined-wavelength transmitting function may be obtained by adding a special optical filter.

Since the above-described barcode reader of this embodiment has the substantially semicylindrical lens 140 of an on-chip structure having the lensing function, the shading-correcting (reducing) function, and the predetermined-wavelength transmitting function, it can provide the following advantages.

First, the problems of increasing the size and cost of the device chip due to the photosensors that are long in the second direction can be overcome by the lensing function of the substantially semicylindrical lens 140. However, even when the chip area is reduced, sensitivity equivalent to that in the related art can be achieved.

Shading can be corrected (reduced) by the shading-correcting function of the substantially semicylindrical lens 140 curved in the above-described manner. In particular, since the correction is not made electrically, but is made optically, the responsiveness to changes in the amount of incident light is improved. Moreover, since all the photosensors arranged in the first direction are used, the performance of the pickup device is improved.

The problem of increasing the cost because of an optical filter used for a light source, which emits light with a predetermined wavelength for barcodes, can also be overcome by the predetermined-wavelength transmitting function of the above substantially semicylindrical lens 140. As a result, the optimum characteristics can be achieved.

While the present invention is applied to the barcode reader in the above embodiment, it is also applicable to linear sensors other than the barcode reader.

The configuration of the solid-state image pickup device of the present invention is not limited to that shown in FIGS. 2A and 2B, and various modifications are possible without departing from the scope of the invention.

What is claimed is:

1. A solid-state image pickup device comprising:
   a sensor array having a plurality of photosensors arranged in a first direction so as to generate signal charges in accordance with the amount of received light;
   a transfer register disposed along said sensor array so as to read out, in a second direction, a signal charge generated by each of said photosensors, and to transfer the signal charge in the first direction;
   a substantially semicylindrical lens placed on the upper surface of said sensor array such that the center axis of the semicylindrical lens extends in the first direction, the lens functioning to direct incident light to said photosensors of said sensor array; and
   wherein a distance from the center axis of the lens to a lens surface opposite the lens surface facing the sensor array continuously decreases from each end of the lens to a center of the lens, thus forming a substantially smooth lens surface.

2. The solid-state image pickup device according to claim 1, wherein said substantially semicylindrical lens is partially or entirely made of a substance which is transmissive with respect to a signal of a predetermined wavelength.

3. The solid-state image pickup device according to claim 1, wherein the width of the base of the lens at the interface of the lens and the sensor array, measured in the second direction in which charges are read out from the sensor array to the signal transfer unit, decreases continuously from the ends of the lens towards the center of the lens in the first direction.

4. The solid-state image pickup device according to claim 1, wherein said lens is a positive lens that protrudes outwardly from the sensor array.

5. A barcode scanner for reading a barcode, the barcode scanner comprising:
   a solid-state image pickup device as set forth in claim 1.

6. A solid-state image pickup device comprising:
   a sensor array having a plurality of photosensors arranged in a first direction so as to generate a signal in accordance with an amount of received light;

a signal transfer unit disposed along said sensor array so as to read out a signal generated by each of said photo sensors, and to transfer the signal; and a single generally semicylindrical lens placed over said sensor array and extending the length of said sensor array in the first direction across a plurality of the photosensors such that the center axis of the semicylindrical lens extends in the first direction, the lens functioning to direct incident light to said photosensors of said sensor array, wherein the width of the base of the lens at the interface of the lens and the sensor array, measured in a second direction in which charges are read out from the sensor array to the signal transfer unit, decreases continuously from the ends of the lens towards the center of the lens in the first direction.

7. The solid-state image pickup device according to claim 6, wherein said generally semicylindrical lens has a lens surface that serves a function of correcting shading.

8. The solid-state image pickup device according to claim 6, wherein said generally semicylindrical lens is partially or entirely made of a substance which is transmissive with respect to a signal of a predetermined wavelength.

9. The solid-state image pickup device according to claim 6, wherein said lens is a positive lens that protrudes outwardly from the sensor array.

10. A barcode scanner for reading a barcode, the barcode scanner comprising:

a solid-state image pickup device as set forth in claim 6.

11. A solid-state image pickup device comprising:

a sensor array having a plurality of photosensors arranged in a first direction so as to generate signal charges in accordance with the amount of received light;

a signal transfer unit disposed along said sensor array so as to read out a signal generated by each of said photosensors, and to transfer the signal charges; and a single substantially semicylindrical lens placed over the upper surface of said sensor array such that the center axis of the semicylindrical lens extends in the first direction, the lens functioning so as to direct incident light onto said photosensors of said sensor array, wherein a radius of said lens decreases continuously from each end to a center of the lens, thus providing a smooth lens surface.

12. The solid-state image pickup device according to claim 11, wherein said substantially semicylindrical lens has a lens surface that serves a function of correcting shading.

13. The solid-state image pickup device according to claim 11, wherein said substantially seniicylindrical lens is partially or entirely made of substance which is transmissive with respect to a signal of a predetermined wavelength.

14. The solid-state image pickup device according to claim 11, wherein the width of the base of the lens at the interface of the lens and the sensor array, measured in a second direction in which charges are read out from the sensor array to the signal transfer unit, decreases continuously from the ends of the lens towards the center of the lens in the first direction.

15. The solid-state image pickup device according to claim 11, wherein said lens is a positive lens that protrudes outwardly from the sensor array.

* * * * *